Aug. 30, 1932.   A. Y. DODGE   1,874,927
BRAKE
Original Filed March 10, 1924

Inventor;
A. Y. Dodge
By Jones, Addington, Ames & Seibold
Attys.

Patented Aug. 30, 1932

1,874,927

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE

Application filed March 10, 1924, Serial No. 697,983. Renewed January 21, 1929.

My invention relates to brakes.

One of the objects of my invention is to provide an internal brake construction which is self-energizing to a large extent, and in which nevertheless a substantially uniform pressure and wear is exerted on the brake lining.

A further object of my invention is to provide an internal brake which will combine the advantages of the shoe brake and the band brake.

Further objects will appear from the description and claims.

In the drawing, in which an embodiment of my invention is shown—

Figure 1:
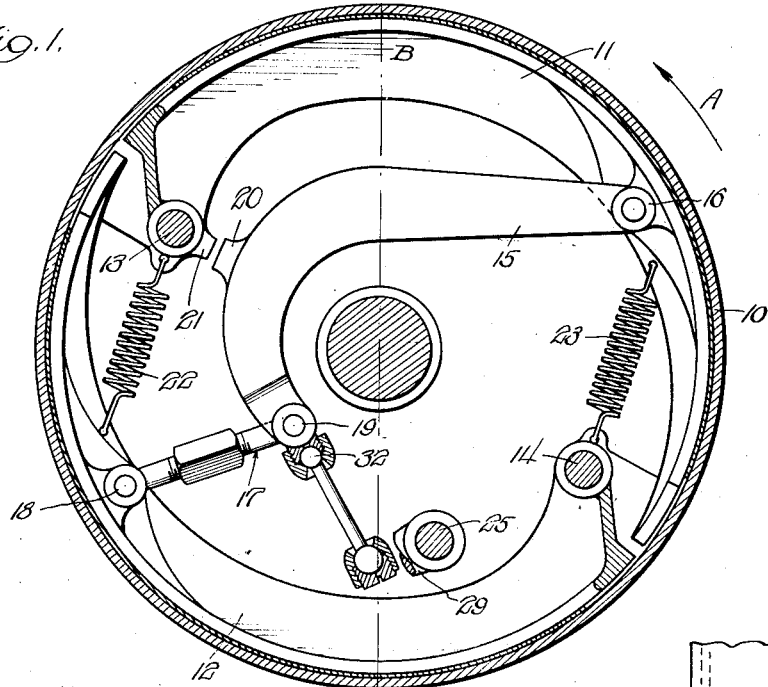
Figure 1 is a side view, partly in section, of an internal brake construction.

In a general way, the construction comprises two internal brake shoes pivoted at diametrically opposite points and extending in the same circumferential direction and means for exerting a substantially radial pressure on these brake shoes at diametrically opposite points, respectively. Each brake shoe may extend substantially through 180°.

Referring now to the drawing in detail, the construction shown comprises a brake drum 10, a pair of internal brake shoes 11 and 12, pivoted on pins 13 and 14, respectively, a curved link 15 pivotally connected at 16 to the brake shoe 11, an adjustable link 17 pivotally connected at 18 to the brake shoe 12, and pivotally connected at 19 to the curved link 15, and means for actuating the links 15 and 17 to cause them to exert radial pressure at diametrically opposite points on the pivoted shoes 11 and 12. Stop members 20 and 21 are provided on the link 15 and brake shoe 11, respectively, to prevent excessive movement of the links 15 and 17; that is, to prevent the pivotal point 19 from passing the dead center line between the pivotal connections at 16 and 18. A pair of springs 22 and 23 are provided interconnecting the brake shoes 11 and 12 for normally holding the brake shoes away from the brake drum.

The brake shoes are interfitted by a tongue and notch connection 24 (Fig. 3), to hold them in alinement with each other.

Figure 2:
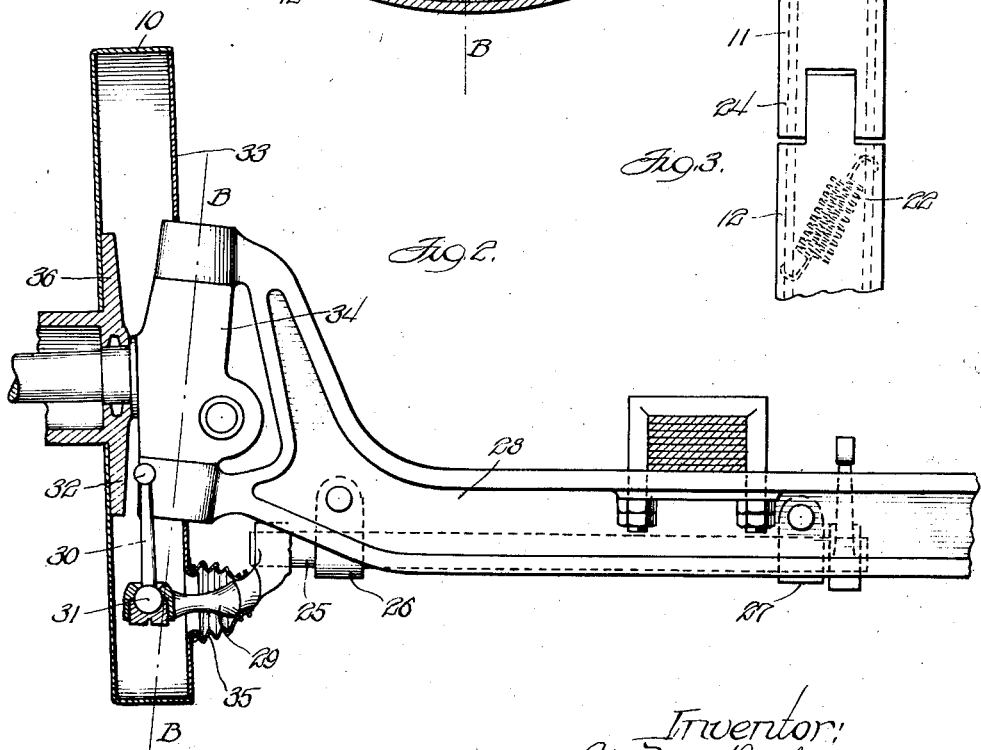
Fig. 2 is an axial section.

The means for actuating the links 15 and 17 comprise a rock shaft 25, mounted in bearings 26 and 27 on the axle 28, a rock arm 29 secured to the rock shaft 25, and a link 30 having a ball-joint connection with the rock arm and the links at 31 and 32, respectively. The rock shaft 25 is actuated by the brake pedal (not shown). The pins 13 and 14 on which the brake shoes are pivotally mounted may be mounted on a plate 33 secured to the steering knuckle 34. A flexible dust-proof connection is made at 35 between the plate 33 and the arm 29. The ball joint connections at 31 is adjacent the axial line B—B of the steering knuckle to permit the steering movement of the wheel 36 on which the brake drum 10 is mounted. As shown in Fig. 2, the connection 31 is offset slightly outwardly from the axis B—B, so that the braking effect on the outside wheel may be relieved slightly in making a turn.

To secure the greatest braking effect, the brake drum rotates in the direction of the arrow A so that the brake shoes 11 and 12 are self-energizing to a considerable extent as in the case of a band brake; and yet because of the shoe construction, the pressure exerted on the brake drum will be substantially uniform throughout a considerable extent.

Figure 3:
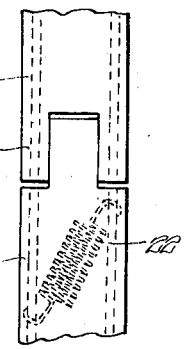
Fig. 3 is a detail view showing the interfitting of the brake shoes.

The springs 22 and 23 extend diagonally, as shown in Fig. 3, so as to exert a lateral force to hold the contiguous faces snugly against each other to prevent rattling of the interfitting ends of the brake shoes. The springs thus not only serve to release the brake shoes but also to prevent rattling.

Having thus described my invention, what I claim as new and desire to secure by Letters Patent of the United States is:—

1. A brake comprising a pair of anchored shoes, with the free end of one shoe overlapping the anchored end of the other shoe.

2. A brake comprising a pair of anchored shoes extending circumferentially in the same direction from their anchored ends, and overlapping each other at their ends.

3. A steerable wheel brake construction comprising an axle, a steering knuckle pivotally connected with said axle, a steerable wheel mounted on said steering knuckle, a brake drum mounted on said steerable wheel, a pair of internal brake shoes acting on said drum, a pair of links pivotally connected together and pivotally connected to said brake shoes, respectively, at opposite points, a rock shaft mounted on said axle, and transmission from said rock shaft to said links, comprising a rock arm on said rock shaft, and a third link connecting said rock arm with said pair of links, the connection of said third link with said rock arm lying adjacent the axis of the steering knuckle.

4. An internal brake construction comprising a brake drum and a pair of arcuate brake shoes bearing on the inner surface of said drums, pivoted adjacent their ends, respectively, and extending in the same circumferential direction from their pivots, the swinging end of one shoe overlapping the pivoted end of the other shoe, said overlapping ends being provided with interengaging means for holding them in alinement.

5. An internal brake construction comprising a brake drum, and two anchored brake shoes bearing on the inner surface of said drum, said brake shoes having overlapping ends provided with interengaging means for holding them in alinement, one of the interengaging ends being the unanchored end of its shoe and the other being the anchored end of its shoe.

6. An internal brake construction comprising a brake drum, and two brake shoes bearing on the inner surface of said drum, said brake shoes having overlapping ends provided with interengaging means for holding them against lateral displacement with respect to each other in one direction, and a biasing spring connecting said shoes for releasing one of said shoes and pressing one of said shoes laterally against the other to prevent rattling.

7. A brake comprising a pair of shoes each anchored at one end and extending circumferentially in the same direction from their anchored ends, each shoe having a free end overlapping the anchored end of the other shoe and interengaged therewith to be held in alignment thereby.

8. A brake comprising a drum, a pair of shoes each anchored at one end within the drum to be urged thereagainst, each shoe having a free end overlapping and interengaged with the adjacent and anchored end of the other shoe and a spring holding the free end of each shoe on a bias toward the anchored end of the shoe overlapped thereby to prevent rattle.

9. A brake comprising a drum, a pair of friction devices anchored within the drum to be urged thereagainst, at least one of said friction devices so formed as to be of gradually decreasing radial extent from its anchored end toward its free end and having its free end overlapping the adjacent end of the other device.

10. A brake comprising a drum, a plurality of friction devices arranged end to end therein, at least one of said friction devices anchored at one end and being of constantly decreasing radial extent from the anchored end toward the free end and having its end of least radial extent held in alignment by the adjacent end of the other device.

11. A brake comprising a drum, a plurality of friction devices arranged therein to be urged thereagainst, at least one of said friction devices being so formed that its radial extent constantly decreases from one end to the other and having its end of least radial extent arranged in overlapping relationship with the adjacent end of the succeeding friction device and interengaged therewith to maintain the alignment, and torque taking means associated with said shoe at its end of greatest radial extent.

12. A brake comprising a drum, a pair of anchored friction members extending circumferentially in the same direction from their anchored ends, said friction members together extending substantially 360° and tapering gradually from their anchored ends toward the other ends, and means for forcing the unanchored end of each of the friction members against the drum.

In witness whereof, I have hereunto subscribed my name.

A. Y. DODGE.